(12) United States Patent
Aust et al.

(10) Patent No.: US 7,958,797 B2
(45) Date of Patent: Jun. 14, 2011

(54) TURNING DEVICE

(75) Inventors: Rainer Aust, Bochum (DE); Marc Neufelder, Witten (DE)

(73) Assignee: Eickhoff Maschinenfabrik GmbH, Bochum (DE)

( * ) Notice: Subject to any disclaimer, the term of this patent is extended or adjusted under 35 U.S.C. 154(b) by 475 days.

(21) Appl. No.: 11/281,933

(22) Filed: Nov. 17, 2005

(65) Prior Publication Data

US 2006/0196288 A1 Sep. 7, 2006

(30) Foreign Application Priority Data

Nov. 18, 2004 (EP) .................................... 04027350

(51) Int. Cl.
*F16H 21/44* (2006.01)
*F16H 27/02* (2006.01)
*B23Q 3/08* (2006.01)

(52) U.S. Cl. .............. 74/99 R; 74/126; 269/32; 415/905

(58) Field of Classification Search ................ 74/25, 44, 74/49, 99 R, 141.5, 142, 143, 126, 128, 129; 81/57.19, 57.2; 416/132 B; 415/905; 269/32, 269/43, 45, 71
See application file for complete search history.

(56) References Cited

U.S. PATENT DOCUMENTS

| | | | | |
|---|---|---|---|---|
| 1,626,322 A | * | 4/1927 | Bell | 242/603 |
| 3,515,009 A | * | 6/1970 | Matusch et al. | 74/128 |
| 4,078,441 A | | 3/1978 | Mazur | |
| 4,181,032 A | | 1/1980 | Wagner et al. | |
| 4,574,664 A | * | 3/1986 | Curry | 81/57.34 |
| 5,762,439 A | * | 6/1998 | Siner | 403/359.6 |
| 5,953,958 A | * | 9/1999 | Young | 74/129 |
| 7,175,389 B2 | * | 2/2007 | Moroz | 416/1 |

FOREIGN PATENT DOCUMENTS

| | | |
|---|---|---|
| DE | 41 35 182 A1 | 4/1993 |
| DE | 100 31 473 C1 | 6/2000 |
| DE | 100 31 472 | 4/2002 |
| EP | 1 167 754 A | 1/2002 |

OTHER PUBLICATIONS

Erich Hau, "Windkraftanlagen: Grundlagen, Technik, Einsatz, Wirtschaftlichkeit" (Wind Energy Systems: Fundamentals, Technology, Use, Efficiency) 2003, pp. 279-282.
European Search Report in EP 04 02 7350 (with translation of pertinent portion).

* cited by examiner

*Primary Examiner* — Thomas R Hannon
*Assistant Examiner* — Alan B Waits
(74) *Attorney, Agent, or Firm* — Collard & Roe, P.C.

(57) ABSTRACT

Turning device (24) for turning the drive train (1) of a wind energy system or at least of partial sections of same, whereby the drive train (1) is mounted to rotate in a machine frame (2), whereby the drive train (1) comprises a flange (16), and the turning device (24) comprises a console (29a) that can be fixed in place on the machine frame (2). The task of the present invention is to indicate a turning device that can turn the drive train (1) at any desired point, without using the gear mechanism (4). This task is accomplished by means of an adapter disk (17) that can be affixed to the flange (16), which has a plurality of force application points (19) that are disposed along a circle (20), and having at least one linear setting element (28a), which is mounted in the console (29a), on the one side, so as to move in terms of angle, and which can be coupled with the adaptor disk (17), on the other side, by way of its force application points (19), so as to move in terms of angle.

4 Claims, 7 Drawing Sheets

TURNING DEVICE

Figure 1:
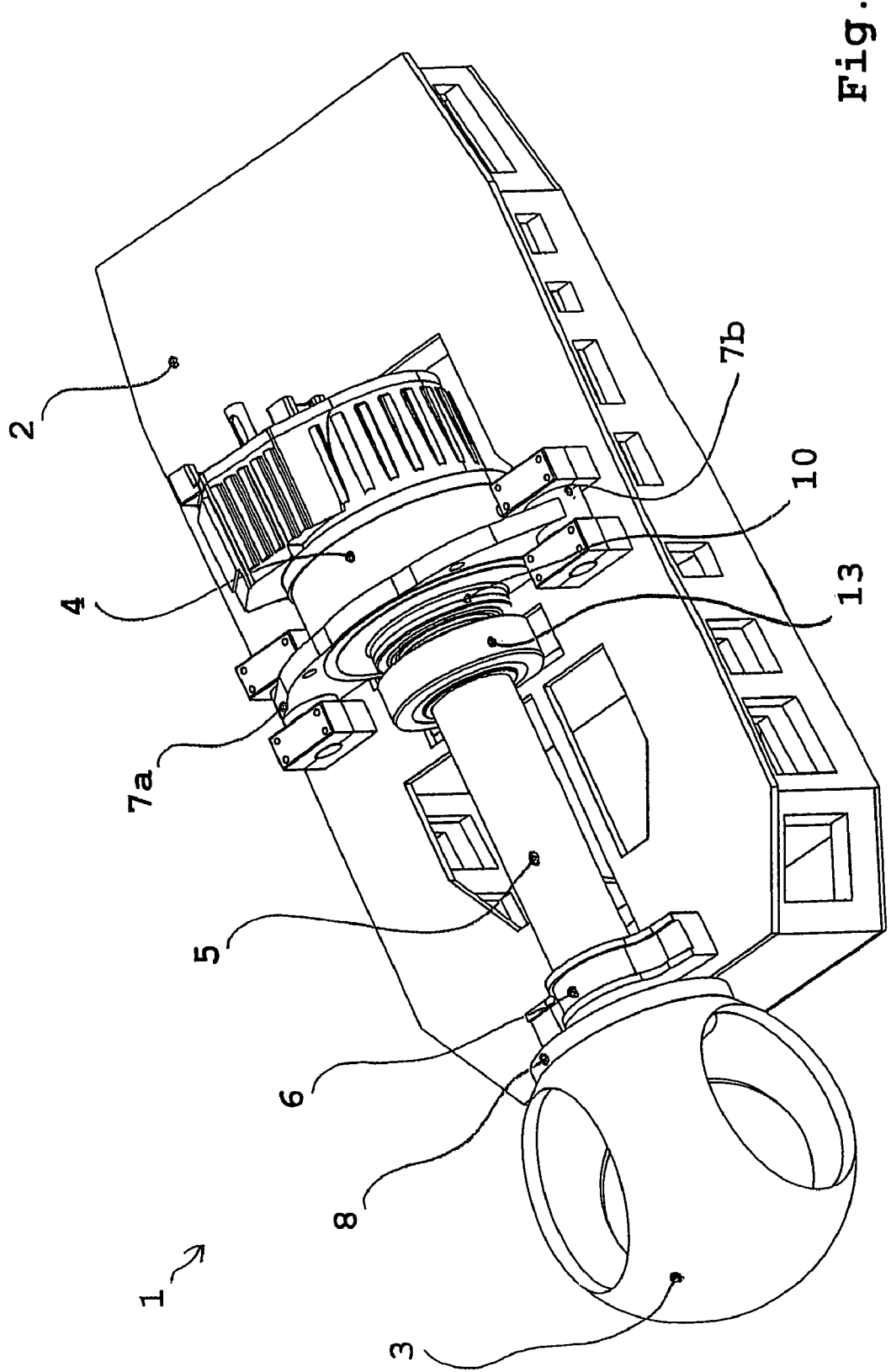

The present invention relates to a turning device for turning the drive train of a wind energy system or at least of partial sections of same, whereby the drive train is mounted to rotate in a machine frame, whereby the drive train comprises a flange and the turning device comprises a console that can be fixed in place on the machine frame. A turning device of this type is known from DE 100 31 473 C1.

In the maintenance of wind energy systems or when replacing worn components, it is necessary to turn the drive train, including the rotor, and in part, also the generator, into a desired angle position and lock it securely in place there. For this purpose, turning and locking devices are used.

The turning device known from DE 100 31 473 C1 is composed essentially of two components: A console-like holder element that can be affixed to a component of the wind energy system, and in which a pinion is mounted, as well as a tool that can be affixed to the holder element and with which the pinion can be driven. Another component of the previously known turning device is a gear-tooth disk that is coupled with the shaft of the drive train. The gear-tooth disk is preferably a geared brake disk that is set onto the gear mechanism output shaft. The holder element is mounted on a component of the wind energy system in such a manner that the pinion meshes with the gear-tooth disk. In this manner, an ancillary drive with auxiliary gear mechanism is formed, which makes it possible to turn the drive train using the tool.

To lock the drive train, DE 100 31 472 C1 proposes a device that comprises a projection that can be submerged radially into the gearing of the gear-tooth disk, and prevents turning of the drive train in this manner.

The rotor diameter of a wind energy system of the 1.5 MW class, which is very common nowadays, is approximately 80 meters. The moment of inertia of the rotor that arises from this alone requires significant drive and locking moments that must be applied by way of the turning device and the locking device, respectively. Furthermore, any assembly-related moments as well as aerodynamic loads are superimposed on the moment of inertia, and set great power requirements for the turning/locking devices. In practice, electric screwdrivers are used as the tool for driving the previously known turning device. Since their drive power is limited, a great translation between the drive shaft of the tool and the drive train of the wind energy system is necessary in order to develop sufficient torque. Since the construction space in the machine gondola is limited, the gear-tooth disks cannot reach just any desired diameter. For this reason, the gear-tooth disk must be disposed on the "fast side" of the drive train, in other words between the gear mechanism and the generator. Thus, when turning the rotor, the translation of the gear mechanism from the ancillary drive of the previously known turning device can be utilized, as well. The translation of a wind energy gear mechanism of the 1.5 MW class is typically 90. Thanks to the great translation, which results from switching the auxiliary gear mechanism and wind energy gear mechanism behind one another, it is possible to turn the powerful rotor with a comparatively "weak" electric tool.

The circumstance that the previously known turning device is able to turn the rotor practically only in combination with the gear mechanism of the wind energy system makes it unusable for certain installation and repair purposes. Thus, it is necessary, in the course of repair work on wind energy gear mechanisms, to divide the drive train up into gear mechanisms, to turn the rotor-side part of the drive train in sections, and to fix it in place in a specific angle position. This is impossible with the previously known turning and locking devices.

The present invention is therefore based on the task of indicating a turning device that is suitable for turning any desired sections of the drive train of a wind energy system, without using the gear mechanism. Furthermore, it must be possible to transport the turning mechanism up the tower easily, and to couple it to the drive train quickly.

This task is accomplished with a turning device of the type stated initially, which comprises an adapter disk that can be affixed to the flange, which has a plurality of force application points that are disposed along a circle, and which furthermore has at least one linear setting element, which is mounted in the console, on the one side, so as to move in terms of angle, and which can be coupled with the adaptor disk, on the other side, by way of its force application points, so as to move in terms of angle.

A fundamental idea of the invention consists in driving the power train not rotationally, but rather in linear manner, in sections. For this purpose, at least one linear setting element is used, which is supported on the machine frame with its one end, and is affixed at a force introduction point of the drive train with its other end. Ball bearing rotation spindles and the like are suitable as setting elements, or, because of their excellent power density, hydraulic cylinders are suitable. The linear setting element is repeatedly extended and retracted for turning, and after every stroke, it is set against a different force application point on the periphery of the circle, if the stroke of the linear setting element is not sufficient to turn the drive train by the desired angle. The kinematic conversion of the linear stroke movement into the rotation movement requires mounting the linear setting element so that it can move in terms of angle, on both sides.

Since the drive trains of existing wind energy systems generally do not have suitable force application points, these are made available, according to the invention, by way of the adapter disk, which must be affixed to the flange that is always present. Of course it is possible to equip a future generation of wind energy systems with suitable force application points in the drive train in the plant. The adapter disk could then be eliminated.

Also, the adapter disk increases the size of the lever arm. In this way, it is possible to keep the stroke force of the linear setting element low, to lower its weight, and even to drive it manually, if necessary.

As already mentioned, the construction space in the gondola is limited, so that the adapter disk, just like the previously known gear-tooth disk, cannot assume just any desired diameter. This would also increase its mass unreasonably. An advantageous further development of the invention consequently consists of not driving the adapter disk directly, but rather providing an additional lever between adapter disk and linear setting element. The lever has an interface by way of which it can be locked in place at the force introduction points of the adapter disk, and furthermore has a lever joint in which the linear setting element can be mounted so that it can move in terms of angle. When mounted to the adapter disk, the lever projects beyond the periphery of the adapter disk merely in a limited sector. In this way, the limited space in the gondola can be optimally utilized.

A suitable flange for affixing the adapter disk advantageously has a plurality of screw heads that are disposed on a screw arc. In this case, the adapter disk is provided with a circle of perforations, the diameter of which corresponds to the diameter of the screw arc, and into the holes of which socket wrench inserts can be set, which fit on the screw heads of the flange. In this manner, a particularly inexpensive connection between adapter disk and flange is created.

The strain washer that connects rotor shaft and gear mechanism is particularly suitable as a flange. Such a strain washer—also referred to as shrink washer—is built into almost every wind energy system, and has the screw heads described above.

It is practical to divide the adapter disk into a plurality of segments, so that it is easier to handle. It suffices to structure the strain washer in two parts. In this way, it can be set onto the drive train from two sides; complicated "threading on" is eliminated.

In the case of almost all maintenance work on wind energy gear mechanisms, it is absolutely necessary to securely lock the drive train in place. A sudden start-up movement of the rotor is possible at any time, due to imbalance and wind gusts, and represents a serious risk of injury for the installers. Since the brake of the wind energy system can be ineffective when the drive train is shut off, it is indicated to make the stroke of the linear setting element lockable. Designed in this way, the turning device acts as a locking device at the same time.

It is advantageously recommended to use two linear setting elements, which exert the required rotary force on the drive train by means of parallel operation. In this way, it is possible to make the individual linear setting elements lighter, and this facilitates their transport to the gondola.

Figure 2:
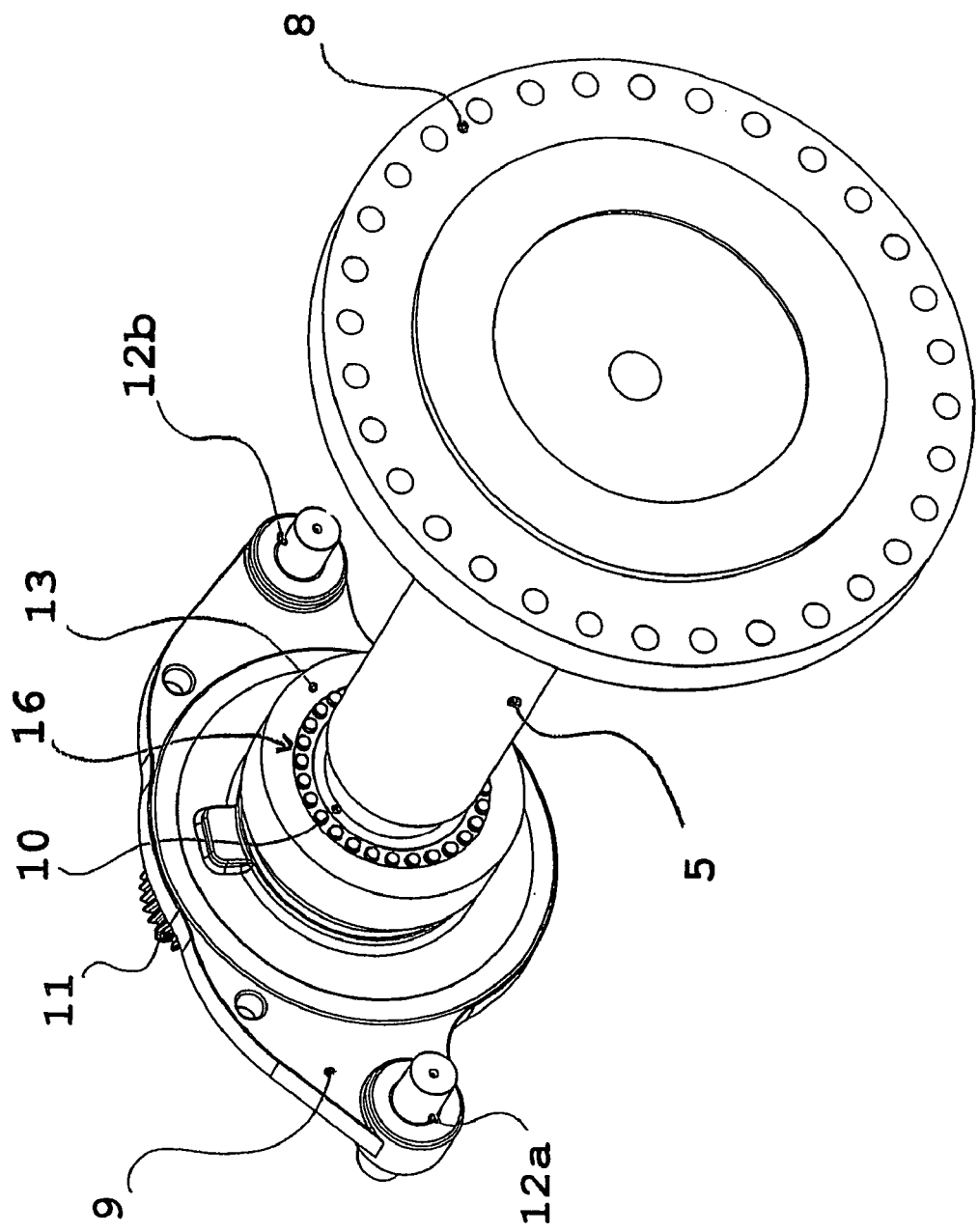
Figure 3:
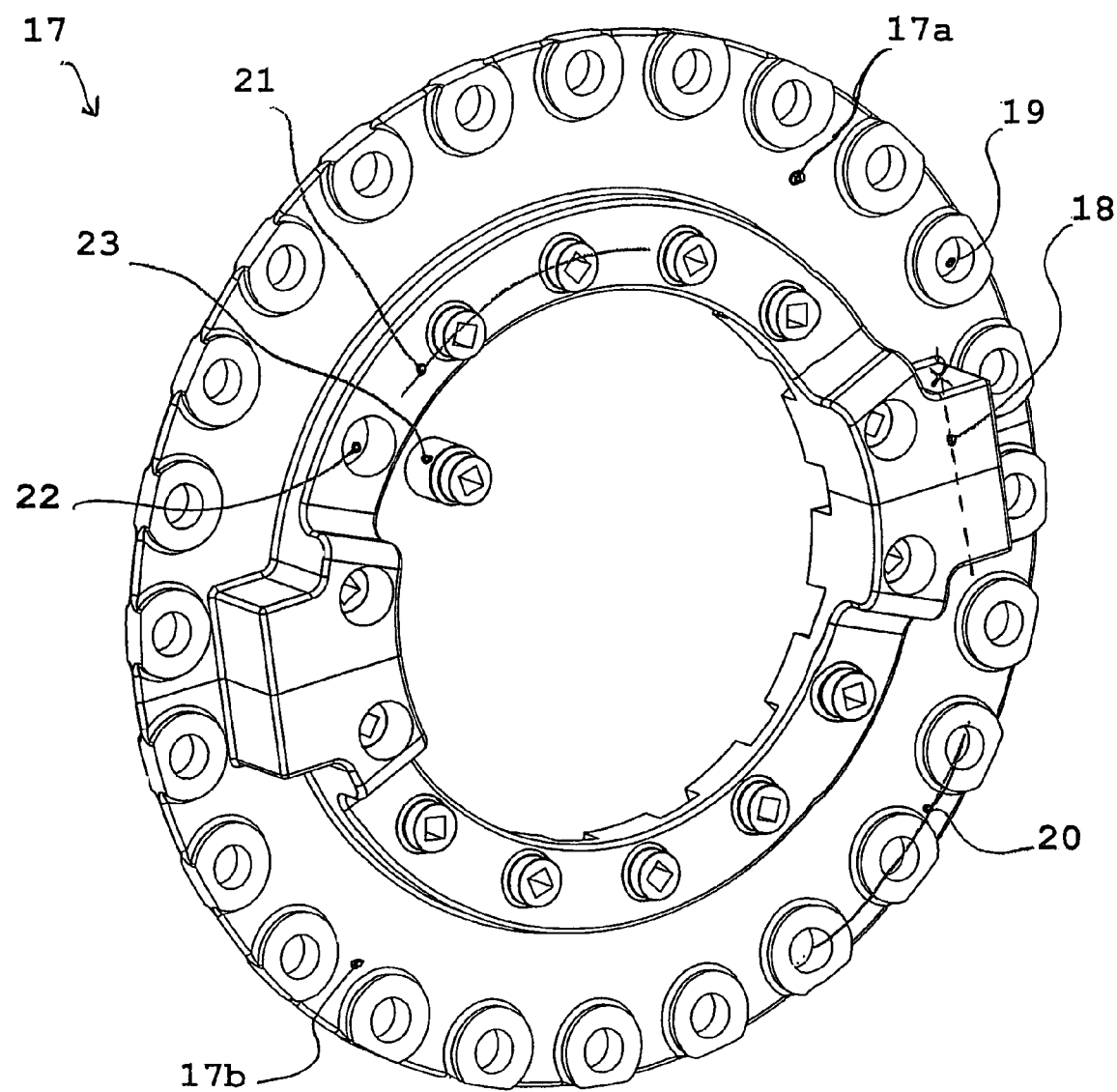
Figure 4:
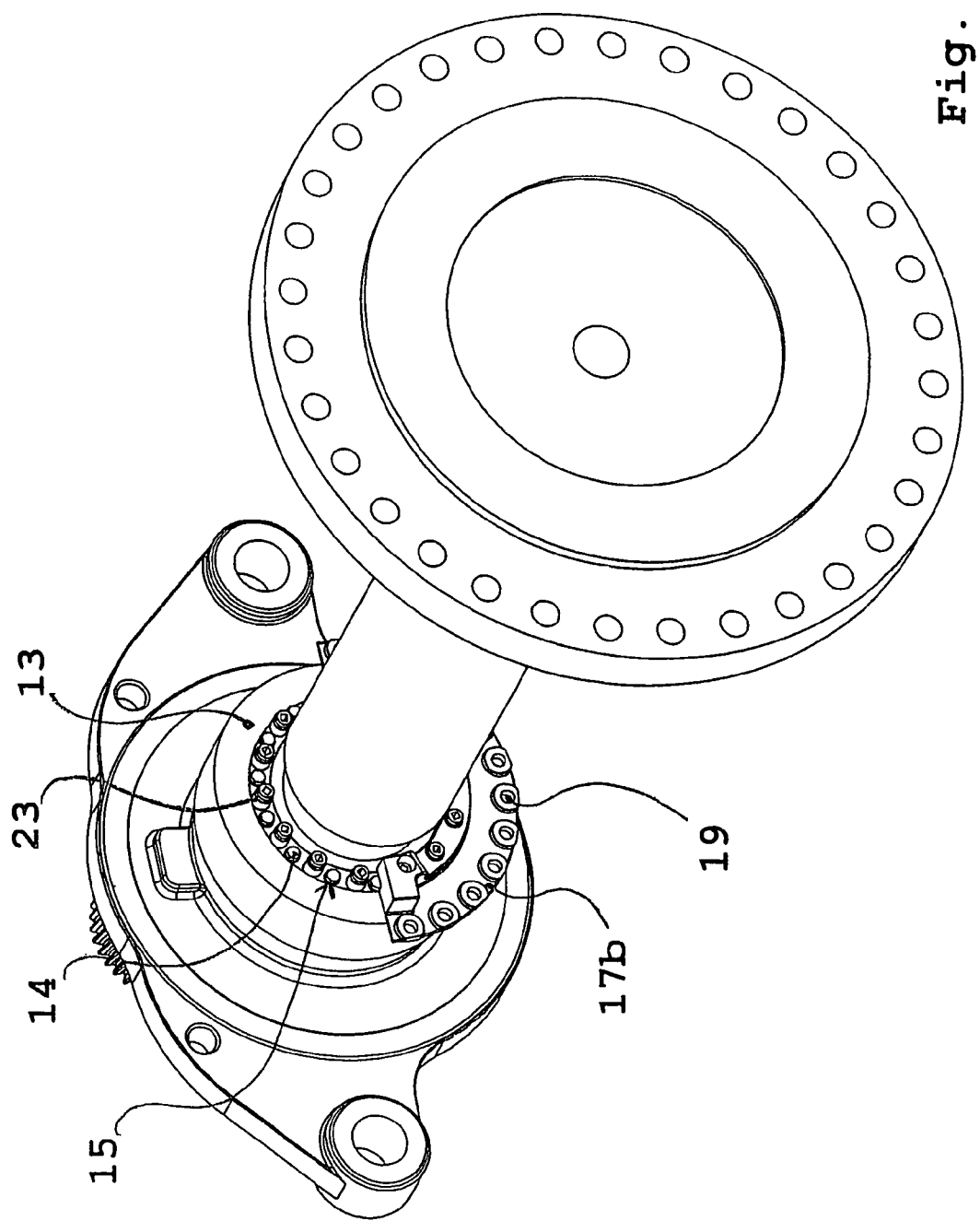
Figure 5:
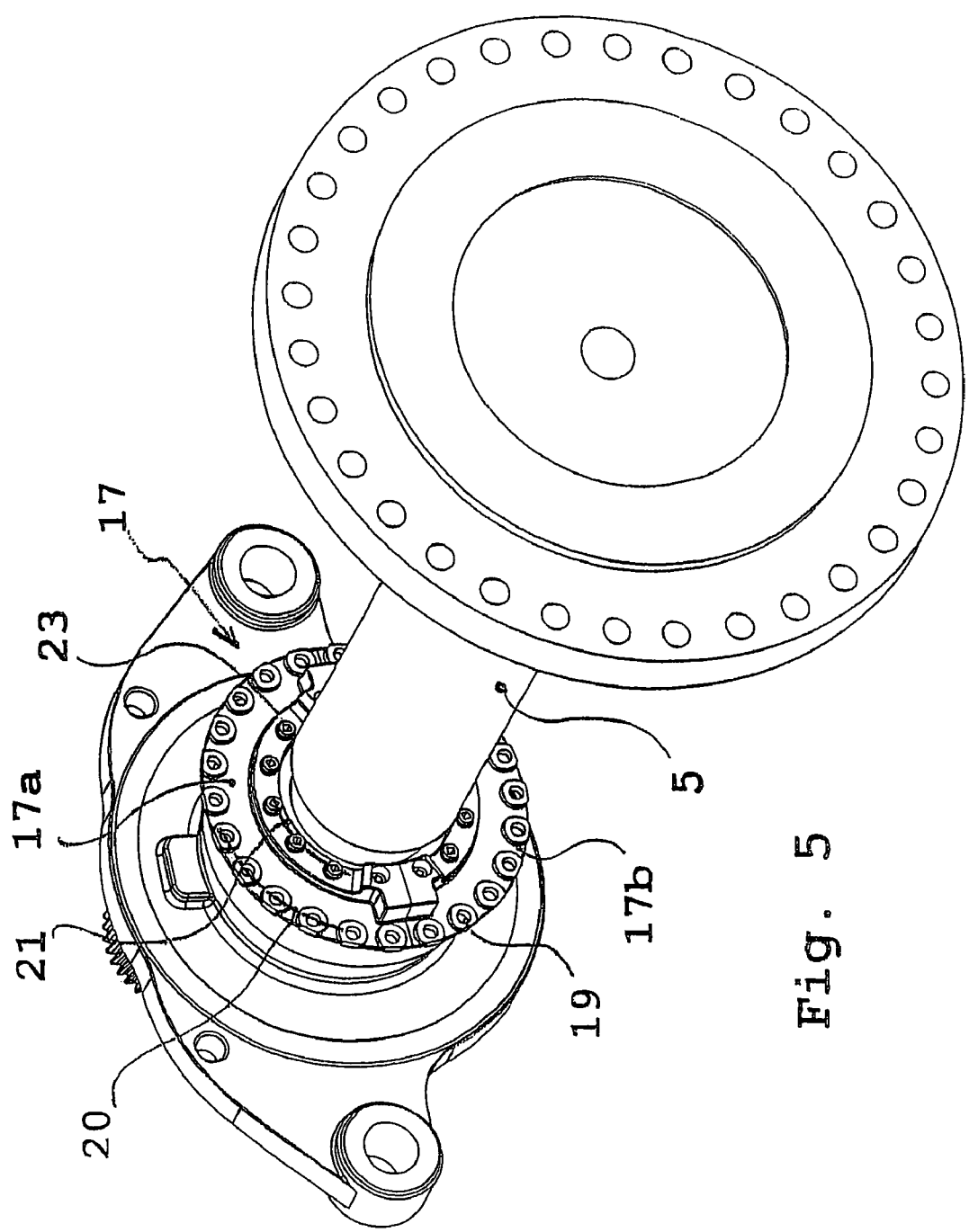
Figure 6:
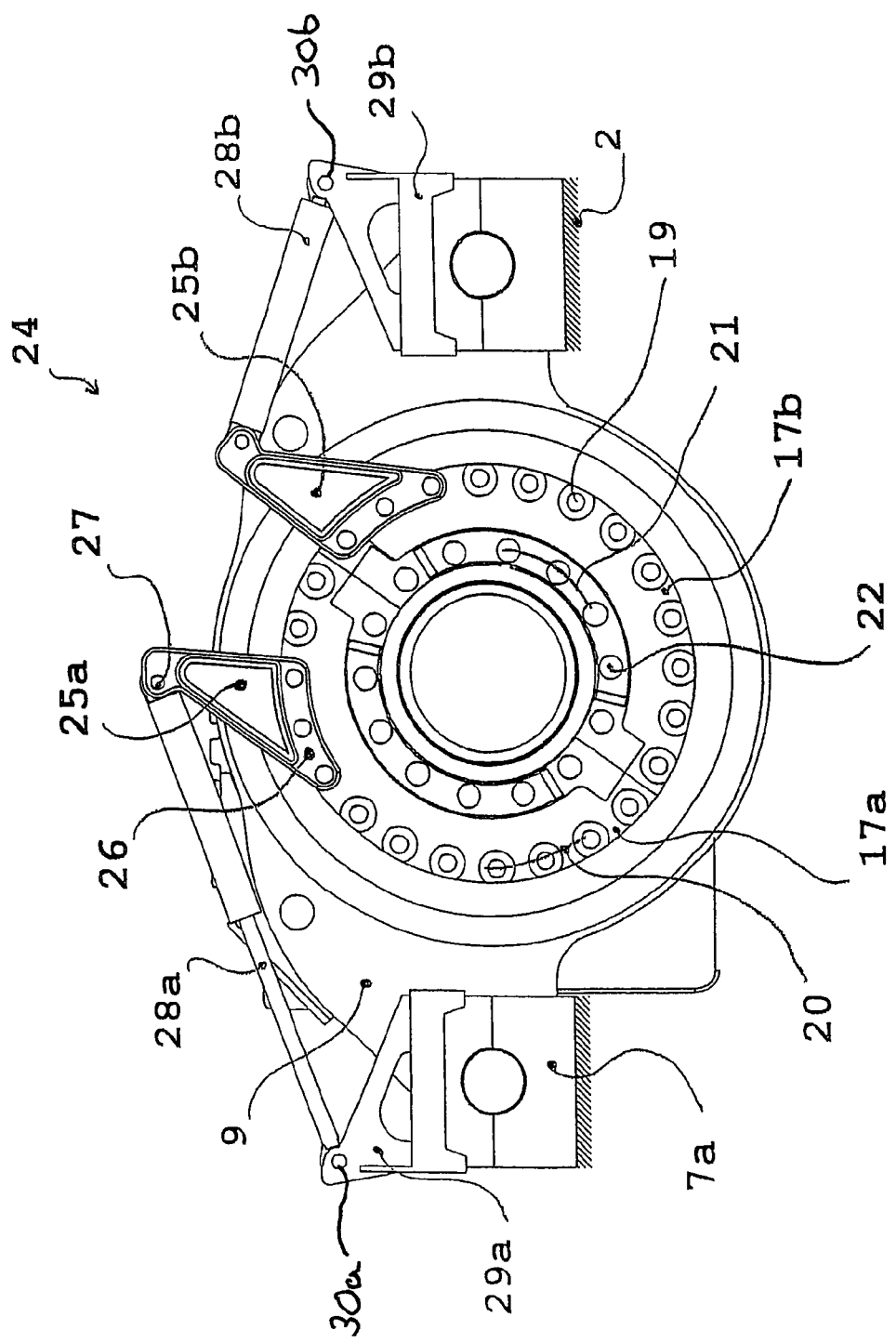
Figure 7:
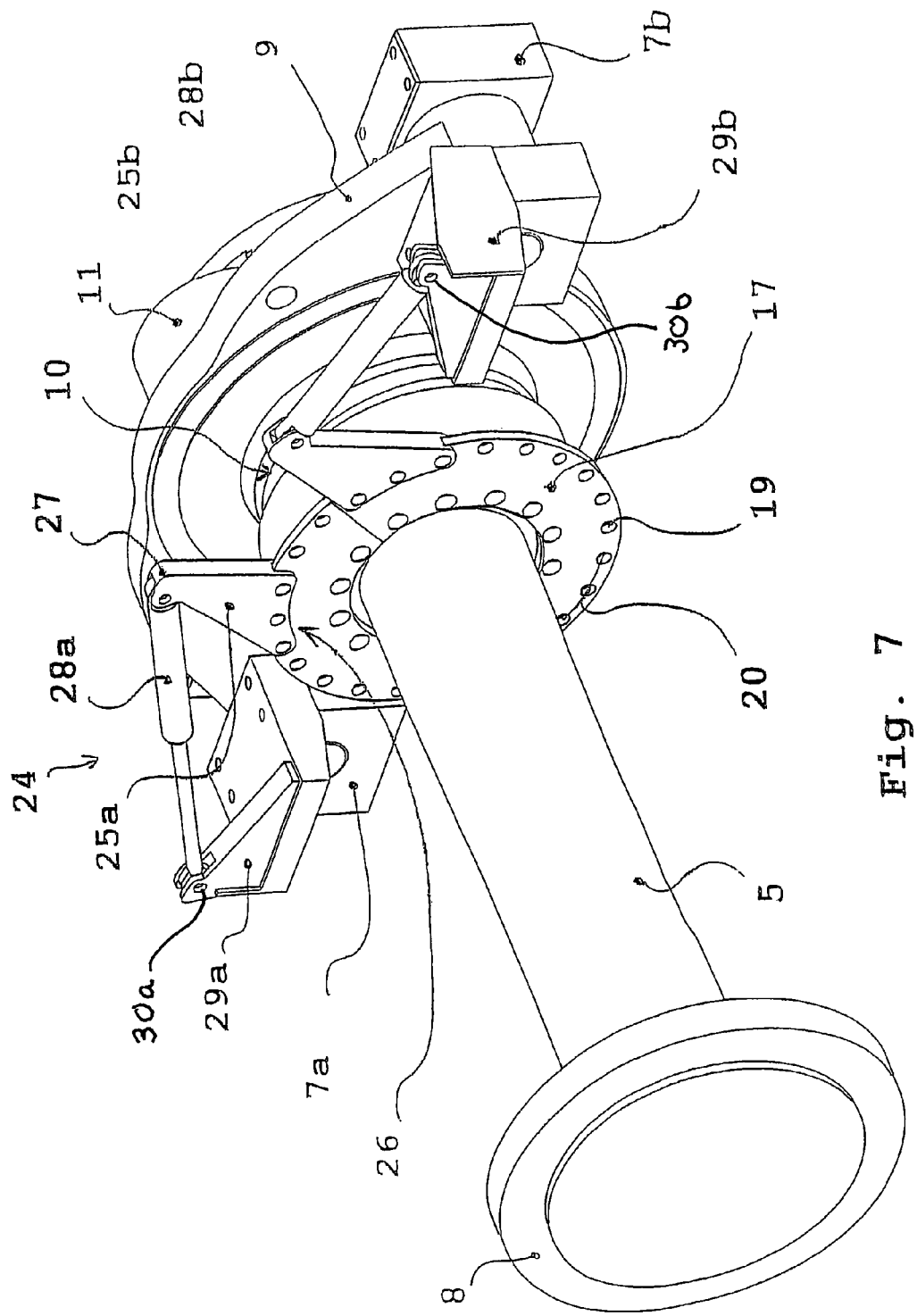

The present invention will now be explained in greater detail below, using an exemplary embodiment. For this purpose, the drawing shows:

FIG. 1: typical drive train of a wind energy system (state of the art);
FIG. 2: hub flange, rotor shaft, and gear mechanism;
FIG. 3: detail of adapter disk with socket wrench inserts;
FIG. 4: hub flange, rotor shaft, and gear mechanism, additionally with adapter disk segment;
FIG. 5: hub flange, rotor shaft, and gear mechanism, with adapter disk, complete;
FIG. 6: turning device, axial view;
FIG. 7: turning device, perspective view.

FIG. 1 shows a drive train of a typical 1.5 MW wind energy system. Additional information can be found in: Hau, Erich. Windkraftanlagen: Grundlagen, Technik, Einsatz, Wirtschaftlichkeit [Wind energy systems: Fundamentals, technology, use, efficiency]. Berlin and others, 2003, pages 279 ff.

The drive train 1 is mounted to rotate in a machine frame 2, and extends from a rotor hub 3 to a generator, not shown here. The heart of the drive train 1 is a gear mechanism 4 that is connected with the rotor hub 3 by way of a rotor shaft 5. The gear mechanism 4 comprises a planetary stage ahead of a standing wheel stage, and translates "to fast," i.e. it increases the low speed of rotation of the rotor into a sufficiently high input speed of rotation for the generator. The drive train 1 is mounted by way of a rotor bearing 6 and by way of two gear mechanism supports 7a, 7b. One speaks of "three-point mounting," with the gear mechanism 4 being an integral part. The gear mechanism supports 7a, 7b are rigidly connected with the machine frame 2, and can therefore be interpreted as part of the latter.

FIG. 2 shows the "slow section" of the drive train 1, in the viewing direction of the gear mechanism 4. A hub flange 8 is shown in the foreground, by means of which the rotor shaft 5 is attached to the rotor hub. In FIG. 2, only a housing cover 9 is shown of the gear mechanism, in which cover a pinion cage 10 is mounted to rotate. In turn, three planetary gears 11 are mounted to rotate in the pinion cage 10, one of which can be seen, partially covered. The housing cover 9 has two bearing bushings 12a, 12b to accommodate bearing pins, by way of which the gear mechanism 4 is mounted in the gear mechanism supports 7a, 7b. The drive of the gear mechanism takes place to the pinion cage 10. For this purpose, the pinion cage 10 is connected with the rotor shaft 5 by means of a strain washer 13.

The strain washer 13 has a plurality of screw heads 14, which are disposed on a screw arc 15. The screw heads 14 serve to tighten the strain washer 13 and to form a non-positive lock connection between pinion cage 10 and rotor shaft 5. The strain washer 13, which is present in almost every drive train of a wind energy system, is used as a flange 16 for affixing an adapter disk 17 in the present exemplary embodiment. Alternatively, the ancillary flange 8 or a coupling, not shown, between power take-off shaft and generator could be used as a flange 16 for the adapter disk 17.

The adapter disk 17 is shown in FIG. 3. It is composed of two segments 17a, 17b, which can be releasably connected with one another by way of bolts 18, shown symbolically. The adapter disk 17 has a plurality of force application points 19, which are disposed along a circle 20. Disposed concentric to the circle 20, the adapter disk 17 has a perforation circle 21, into the holes 22 of which socket wrench inserts 23 according to DIN 3124 or the like can be inserted. The diameter of the perforation circle 21 corresponds precisely to the diameter of the screw arc 15 of the strain washer 13 being used as a flange 16. The socket wrench inserts 23 fit onto the screw heads 14 of the screw arc 15. In this manner, it is possible to connect the adapter disk 17 with the flange 16, by way of the socket wrench inserts 23. In this connection, the socket wrench inserts 23 function as drivers.

FIG. 4 shows how the first segment 17a is set onto the flange 16; in FIG. 5, the second segment 17b of the adapter disk is also installed.

In FIG. 6, the turning device 24 is shown completely assembled. It comprises two levers 25a, 25b that are connected with the adapter disk 17 by way of an interface 26 that corresponds with the force application points 19. The two levers 25a, 25b each have a lever joint 27. A linear setting device 28a, 28b is mounted in this lever joint 27, in each instance, with one end, so as to move in terms of angle. The linear setting elements 28a, 28b are standard hydraulic cylinders, which are connected with a commercially available manual or electric pump, not shown. The connection must be made in such a manner that the one hydraulic cylinder (=28a) moves out when the other hydraulic cylinder (=28b) moves in. In this manner, the adapter disk 17 is pulled and pushed at the same time; the linear setting elements 28a, 28b only have to exert half the rotary force, making them comparatively light and easy to transport.

With their second end, the linear setting elements 28a, 28b are mounted on joints 30a, 30b in consoles 29a, 29b, so as to move in terms of angle; these consoles, in turn, can be screwed onto the gear mechanism supports 7a, 7b of the machine frame 2 for certain periods of time.

In order to turn the drive train 1 with the turning device 24 according to the invention, the first linear setting element 28a is retracted and, at the same time, the second linear setting element 28b is extended. In this way, the drive train 1 is turned by an angle of approximately 30°. If the drive train is supposed to be turned beyond this angle, the connections between the interfaces 26 of the levers 25a, 25b and the force application points 19 of the adapter disk 17 are released, one after the other, and are then set against a new section of the circle 20, in accordance with the stroke of the linear setting elements 28a, 28b. In this manner, it is possible to turn the drive train 1 by 360° in any desired direction, in that the levers 25a, 25b are set against new force application points 19, in each instance.

In order to prevent accidental movement of the drive train 1, the linear setting elements 28a, 28b should be lockable. This is easily possible, for example, when using hydraulic cylinders, by means of blocking off the cylinder spaces that are filled with pressure medium. In this connection, attention must be paid to having the linear setting elements 28a, 28b lockable individually, and able to hold the rotor, so that one linear setting element can remain locked in position, while the other is released and set against the adapter disk 17 in a new location.

It is also possible to do without the levers 25a, 25b, and to set the linear setting elements 28a, 28b directly against the force application points 19 of the adapter disk 17. Then, however, they must be able to apply a correspondingly greater force.

The entire turning device can be broken down into a manageable number of units having low weight, which can easily be heaved into the gondola by the on-board cranes present in wind energy systems. There is no need to use external mobile cranes, which is costly.

The invention claimed is:

1. A wind energy system comprising a drive train, a rotor hub, a gear mechanism and a turning device for turning the drive train,
    wherein blades are mounted to the rotor hub,
    wherein the drive train comprises a rotor shaft connecting the rotor hub with the gear mechanism,
    wherein said rotor shaft is connected with a flange, the flange comprising a strain washer that connects the rotor shaft with the gear mechanism,
    wherein the turning device comprises first and second consoles that can be fixed in place on the machine frame,
    wherein an adapter disk is affixed to the flange, said adapter disk being divided into first and second segments and having a plurality of force application points that are disposed along a circle,
    wherein a first linear setting element comprising a first hydraulic cylinder is mounted in the first console on a first side of the first linear setting element, said first linear setting element is coupled with the first segment of the adapter disk on a second side of the first linear setting element via a first set of force application points of said plurality of force application points, and said first linear setting element is angularly adjustable at the first and second sides of the first linear setting element,
    wherein a second linear setting element comprising a second hydraulic cylinder is mounted in the second console on a first side of the second linear setting element, said second linear setting element is coupled with the second segment of the adapter disk on a second side of the second linear setting element via a second set of force application points of said plurality of application points, and said second linear setting element is angularly adjustable at the first and second sides of the second linear setting element, and
    wherein the first and second hydraulic cylinders rotate the flange in a first and second direction.

2. The wind energy system according to claim 1, wherein the first and second linear setting elements comprise respective first and second levers, wherein
    said first and second hydraulic cylinders comprise respective first and second lever joints in which the first and second hydraulic cylinders are respectively mounted for angular movement, and
    each of said first and second linear setting elements has a respective interface that corresponds to the force application points of the adapter disk, by way of which the first and second levers can be locked in place on the first and second segments of the adapter disk, respectively.

3. The wind energy system according to claim 1, wherein the flange has a plurality of screw heads that are disposed on a screw arc, and
    the adapter disk has a perforation circle comprising a plurality of holes, the perforation circle having a diameter corresponding to that of the screw arc, and into the holes of said perforation circle socket wrench inserts are set, said socket wrench inserts fitting on the screw heads.

4. The wind energy system according to claim 1, wherein the first and second hydraulic cylinders have a respective stroke lockable in place.

* * * * *

UNITED STATES PATENT AND TRADEMARK OFFICE
CERTIFICATE OF CORRECTION

| | | |
|---|---|---|
| PATENT NO. | : 7,958,797 B2 | Page 1 of 1 |
| APPLICATION NO. | : 11/281933 | |
| DATED | : June 14, 2011 | |
| INVENTOR(S) | : R. Aust et al. | |

It is certified that error appears in the above-identified patent and that said Letters Patent is hereby corrected as shown below:

In particular, in Column 5, between lines 28 and 29, (between lines 4 and 5 in Claim 1,) please insert the following paragraph:
--wherein the drive train is mounted to rotate in a machine frame,--.

Signed and Sealed this
Ninth Day of August, 2011

David J. Kappos
*Director of the United States Patent and Trademark Office*